(12) United States Patent
Shimizu et al.

(10) Patent No.: US 8,027,068 B2
(45) Date of Patent: Sep. 27, 2011

(54) IMAGE-CAPTURING UNIT AND IMAGE-CAPTURING APPARATUS

(75) Inventors: Masao Shimizu, Minamikoma-gun (JP); Mamoru Noda, Minamikoma-gun (JP)

(73) Assignee: Nisca Corporation, Minamikoma-gun (JP)

( * ) Notice: Subject to any disclaimer, the term of this patent is extended or adjusted under 35 U.S.C. 154(b) by 918 days.

(21) Appl. No.: 11/962,129

(22) Filed: Dec. 21, 2007

(65) Prior Publication Data
US 2008/0158533 A1 Jul. 3, 2008

(30) Foreign Application Priority Data

Dec. 28, 2006 (JP) .............................. JP-2006-356458

(51) Int. Cl.
*H04N 1/04* (2006.01)
(52) U.S. Cl. ......... 358/496; 358/494; 358/481; 358/474
(58) Field of Classification Search .................. 358/496, 358/481, 494, 474
See application file for complete search history.

(56) References Cited

U.S. PATENT DOCUMENTS

| | | | | |
|---|---|---|---|---|
| 5,335,083 A | * | 8/1994 | Nagane | 358/400 |
| 7,123,389 B2 | * | 10/2006 | Yui | 358/496 |
| 2003/0210442 A1 | * | 11/2003 | Sheng | 358/532 |

FOREIGN PATENT DOCUMENTS

JP H09-069915 A 3/1997

* cited by examiner

*Primary Examiner* — Houshang Safaipour
(74) *Attorney, Agent, or Firm* — Judge Patent Associates

(57) ABSTRACT

For an image-capturing unit having a light source and mirrors directing light reflected from a scanned document into a lens condensing the light onto a photoelectrically converting image sensor, a synthetic resin housing. The housing is composed of an open-ended upper frame having a top plate from which sidewalls extend, encompassing an internal space. A mounting surface for anchoring the light-source is formed on the upper side of the upper-frame top plate, and formed on the lower side of the upper-frame top plate is a pedestal on which the lens is supported. Mirror-support projections are formed on the lower side of the upper-frame top plate, or on the upper-frame sidewalls, to support the mirrors from below the lens. With this housing, the influence of heat from the light source on the optics is minimized, improving the mirrors' positional accuracy.

8 Claims, 6 Drawing Sheets

400
IMAGE-CAPTURING UNIT AND IMAGE-CAPTURING APPARATUS

BACKGROUND OF THE INVENTION

1. Technical Field

The present invention relates to image-capturing units that capture image information from documents, and to image-capturing apparatus furnished with such image-capturing units.

2. Description of the Related Art

Recent years have seen demands for the speed at which scanners capture information to be made faster. To make the capturing speed faster while acquiring satisfactory images requires a light source with an increased quantity of light.

However, the light sources, such as xenon lamps, often used for scanners generate an increased quantity of heat when providing an increased quantity of light. A consequent problem that arises is that heat from the light source deleteriously deforms the mirrors and other optical components.

Furthermore, a unit frame on which the optical members are supported has been composed of a synthetic resin in order to reduce the weight of the unit frame. The unit frame has thus been integrally molded by a technique of pouring an aqueous synthetic resin into a mold. When mirrors are located below a lens as in the case of the unit shown in FIGS. 1 and 2 of Japanese Unexamined Pat. App. Pub. No. H09-66915, a fixing member for the mirrors needs to be formed below a fixing member for the lens. This complicates the shape of the mold. Moreover, if only the upper side of the frame is open and the frame must be extracted from the mold through this opening, the mold-extraction direction needs to be taken into account. This further complicates the shape of the mold. In particular, the level of complexity of the shape of the mold increases with decreasing distance to the bottom the frame; that is, the level of complexity increases consistently with the distance from the opening in the unit. This reduces molding accuracy. Thus, if the mirrors are fixed to the bottom of the unit, the positional accuracy of the mirrors decreases. To solve this problem, an adjustment mechanism for the mirrors may be provided. However, this may increase the number of parts required and the number of assembly steps, sharply increasing costs.

BRIEF SUMMARY OF THE INVENTION

The present invention has been made in view of these circumstances. An object of the present invention is to provide an image-capturing unit and an image-capturing apparatus which minimize the adverse effect of heat from the light source on the optical elements and which serve to increase the positional accuracy of the optical members such as the mirrors even though the optical members are arranged at the bottom of the image-capturing unit.

To accomplish the object, the present invention provides an image-capturing unit reading an image from a document, comprising a light source irradiating the document with light, a mirror group comprising a plurality of mirrors reflecting reflected light from the mirror, a final mirror reflecting the light reflected by the mirror group, a lens condensing the light incident on the lens via the final mirror, an image sensor photoelectrically converting the light condensed by the lens, a sensor board with the image sensor mounted thereon, and a synthetic resin frame with the light source, the mirror group, the lens, and the sensor board mounted thereon, wherein the frame has an upper frame having a top plate and sidewalls extending downward from the top plate and having a space inside which is surrounded by the top plate and the sidewalls and which has an open bottom, and a lower frame covering the bottom of the upper frame, wherein a light-source anchoring portion is formed on a top surface of the top plate of the upper frame so that the light source is fixed to the light-source anchoring portion, and a lens support member is formed on a bottom surface of the top plate of the upper frame to support the lens, and wherein a mirror support member is formed on the bottom surface of the top plate of the upper frame or on the sidewall to support the mirror group below the lens.

According to the present invention, the heat-emitting component(s) is fixed to the top surface (outside) of the top plate of the upper frame, and the optical member is fixed to the bottom surface (inside) of the top plate of the upper frame. The top plate thus blocks radiation heat from the light source to reduce the adverse effect of heat on the optical member. Moreover, the upper frame has the open bottom, preventing the shape of a mold from being complicated. This also allows an increase in the accuracy of the frame (mirror support section) even though the frame is located at the bottom of the image-capturing unit, resulting in the increased positional accuracy of the mirror group. The mirror group is fixed to the upper frame below the lens to form an optical path below the lens. The present invention further enables the mirror group to be easily mounted on the frame.

DETAILED DESCRIPTION OF THE INVENTION

An embodiment of the present invention will be described below with reference to the drawings.

Figure 1:
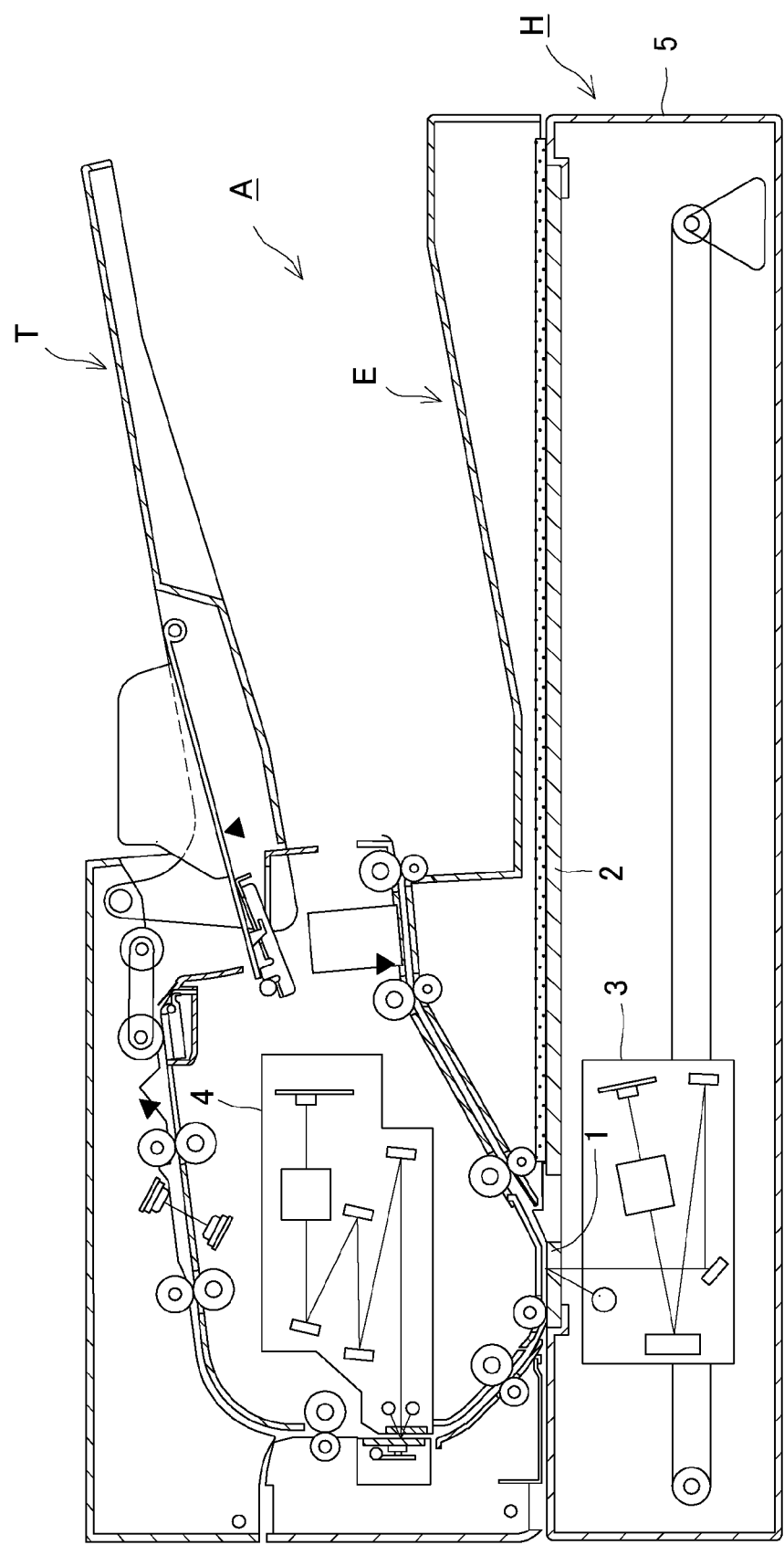
FIG. 1 is a sectional view showing an image-capturing apparatus comprising a document conveying device according to an embodiment of the present invention.

FIG. 1 is a sectional view showing an image-capturing apparatus comprising a document conveying device according to an embodiment of the present invention. The image-capturing apparatus to which the present invention is applied will be described with reference to FIG. 1. The image-capturing apparatus H can be independently used as a scanner or connected to an image forming apparatus main body such as a printer so as to serve as a part of an MFP (Multi Function Peripheral). Reference numeral A in the figures denotes a document conveying device mounted in the image-capturing apparatus H. The document conveying device A separates a document from a set of documents on a sheet feeding tray T, conveys the sheet over a top surface of first contact glass 1 in the image-capturing apparatus H, and discharge the sheet onto a sheet discharging tray E. The document conveying device A comprises a second reading unit 4 that allows both front and back surfaces of the document to be read during a single conveying operation.

The image-capturing apparatus H comprises the first contact glass (first platen glass) 1 that defines an image-capturing surface allowing the document being conveyed by the document conveying device A to be read, second contact glass (second platen glass) 2 having an area sufficient to allow the document to be loaded on the second contact glass 2, a first reading unit 3 as an image-capturing unit that reads the document being conveyed by the image conveying device A or the sheet loaded on the second contact glass 2, and a box-like casing 5 which supports the first and second contact glasses 1 and 2 and which accommodates the first reading unit 3. The first reading unit 3 is supported by the casing 5 via guide means such as a guide shaft so as to be movable along the second contact glass 2 by driving means such as a motor. To read the document on the second contact glass 2, the first reading unit 3 moves along the second contact glass 2 for reading. To read the document being conveyed by the document conveying device A, the first reading unit 3 is stopped at a position shown in FIG. 1 for reading.

Figure 2:
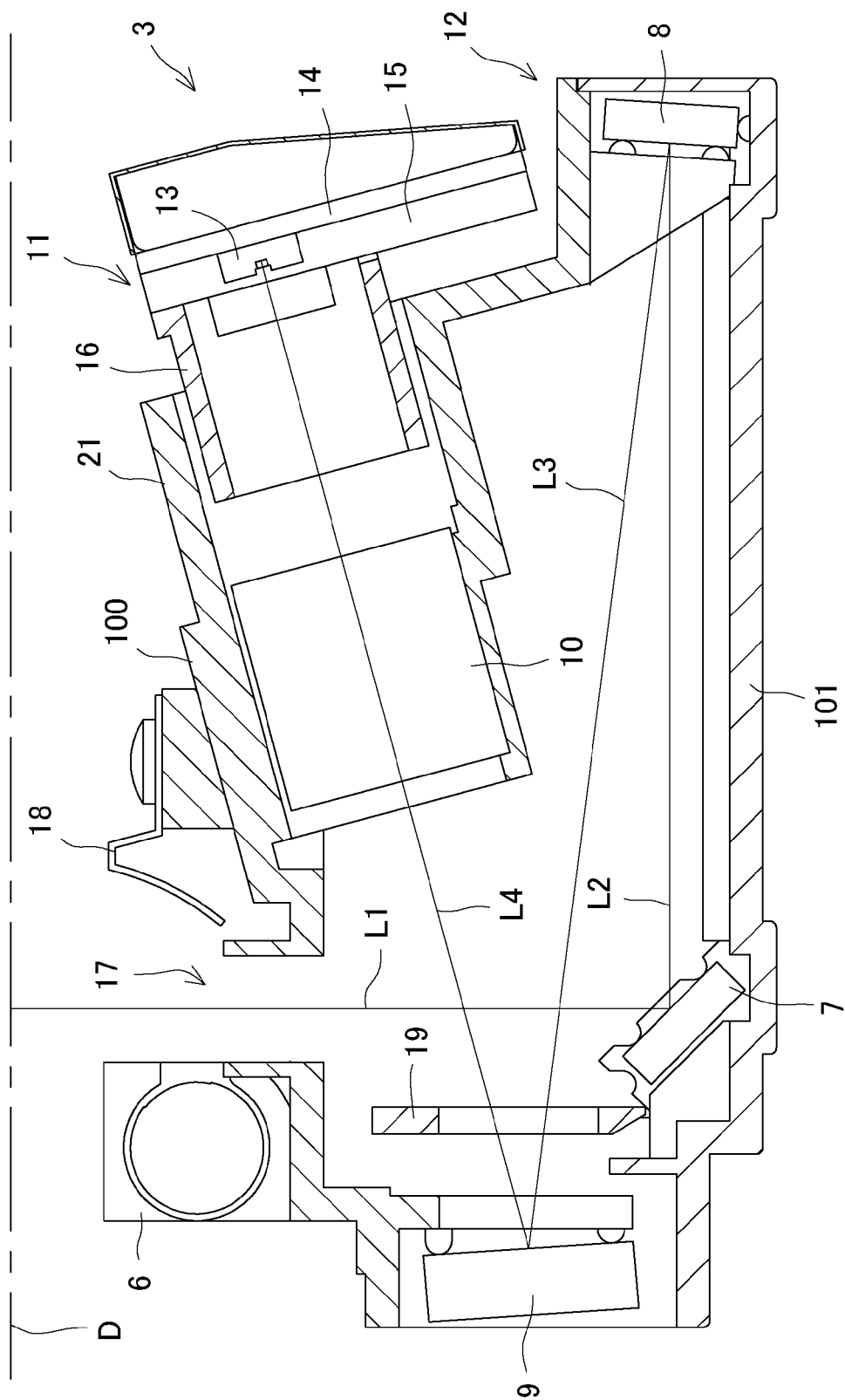
FIG. 2 is a sectional view showing a general configuration of a first reading unit.

FIG. 2 shows a general configuration of the first reading unit 3 in section. As shown in the figure, the first reading unit 3 comprises a lamp (light source) 6 composed of a xenon lamp or the like and shaped like an elongate bar extending in a main scanning direction (the direction of arrow X in FIG. 3), and an optical system that receives reflected light from the document to propagate the received light along a predetermined optical path. Specifically, in the present embodiment, the optical system has a reflecting optical system made up of a first reflection mirror (hereinafter simply referred to as a first mirror) 7 located below the document D to receive reflected light from the document D, a second reflection mirror (hereinafter referred to as a second mirror) 8 that reflects the light from the first reflection mirror 7, and a third reflection mirror (hereinafter referred to as a final mirror) 9 that reflects the light from the second reflection mirror 8, as well as a condensing lens (hereinafter simply referred to as a lens) 10 that condenses the light from the final mirror 9. The first reading unit 3 comprises a sensor unit 11 mounted at a condensing position of the lens 10 to read the document, a synthetic resin housing 12 that supports the lamp 6, the lens 10, the mirrors 7, 8, and 9, and the sensor unit 11, and a reflector 18 located opposite the lamp 6 so as to provide a greater quantity of light (a higher luminance) at position where the document D is irradiated with light. In the present configuration, the optical system is incorporated in an internal space S in the housing 12 in a predetermined form described below.

The first reading unit 3 comprises a shading correction plate 19 having an opening with an opening width smaller in the center thereof than in the periphery thereof so as to reduce the difference in light quantity between the center and periphery of the lens 10 to provide a uniform (flat) light quantity on a reading line.

The housing 12 is composed of an upper frame 100 and a lower frame 101 each of which is integrally molded of a synthetic resin. The sensor unit 11 is composed of an image sensor 13 having a plurality of photoelectric converting elements such as a CCD to photoelectrically convert light from the document D, a sensor board 14 having the image sensor 13 mounted thereon and various circuits such as a driver circuit formed thereon to drive the image sensor 13, and a holding member 15 that holds the sensor board 14 to adjust the position of the sensor unit 11 in order to adjust the position of the image sensor 13. The holding member 15 has a cylindrical light shielding member 16 formed thereon to prevent external light from entering the image sensor 13.

The document D irradiated with light from the lamp 6 reflects the light (first optical path L1). The light travels straight downward (a direction substantially orthogonal to an image-capturing surface) from the document and enters the reading unit 3 through an opening 17 formed in a top surface of the reading unit 3. The light is then reflected by the first mirror 7, located immediately below the opening 17 and below the lens 10. The light reflected by the first mirror 7 travels to the second mirror 8, located below and behind the lens 10 to form a second optical path L2 between the first mirror 7 and the second mirror 8; the second optical path L2 passes below the lens 10 and the sensor unit 11 and substantially parallel to the document D (image-capturing surface). Moreover, the light reflected by the second mirror 8 travels toward the final mirror 9, located below the lamp 6 in front of (closer to an incidence surface of) the lens 10. An optical path L3 crossing the first optical path L1 is formed between the second mirror 8 and the final mirror 9.

The light reflected by the final mirror 9 enters the lens 10, is condensed by the lens 10, and then enters the image sensor 13, fixed to the condensing position. The final mirror 9 is located below the lens 10 and the image sensor 13, a fourth optical path L4 extending from the final mirror 9 through the lens 10, into the image sensor 13 is inclined to the document D (image-capturing surface) (the final mirror 9 is located below and away from the document). That is, in the present configuration, the final mirror 9 is located in the internal space S in the housing 12 at a predetermined first position P lying opposite the second mirror 8 across the first optical path L1. The lens 10 is located in the in the internal space S in the housing 12 at a second position Q lying above the first position P (lying opposite the final mirror 9 across the first optical path L1).

The shading correction plate 19 is located closer to the incidence side of the lens 10 and below the lamp 6 to block a part of each of the third optical path L3 and the fourth optical path L4 for mechanical shading correction. That is, in the present embodiment, the shading correction plate 19 is positioned opposite the lens 10 across the first optical path L1 and between the first mirror 7 and the final mirror 9 to adjust the light quantity of each of the third optical path L3 and the fourth optical path L4.

The image sensor 13 forms an electric signal from the incident light. An A/D converter and an image processing circuit on the sensor board 14 then execute digital signal conversion and image processing on the electric signal, which is then output to an image forming apparatus such as a printer or a personal computer via a cable or a PCB board.

The mirrors 7, 8, and 9, the lens 10, and the sensor unit 11 are thus arranged so that the fourth optical path L4 from the final mirror 9 to the image sensor 13 is angled to the document (first contact glass 1 or second contact glass 2). The long optical path can thus be formed using the smaller occupying space, effectively enabling a reduction in the size of the unit.

Furthermore, the lamp 6 is fixed to the position between the first optical path L1 and the final mirror 9 (in other words, opposite the lens 10 across the first optical path L1) where the corresponding part of the fourth optical path L4 lies lower than the remaining part (the area of the housing 12 which is closer to the first position P than to the second position Q). The lamp 6 can thus be fixed to a lower position, effectively reducing the size of the unit, particularly, the thickness thereof. Furthermore, in the present embodiment, the lens 10 is fixed between the first mirror 7 and the second mirror 8, allowing the space (free space) between the mirrors 7 and 8 to be effectively utilized as an installation space for the lens 10 to reduce the thickness of the unit.

Now, the upper frame 100 will be described in detail with reference to FIG. 3.

Figure 3:
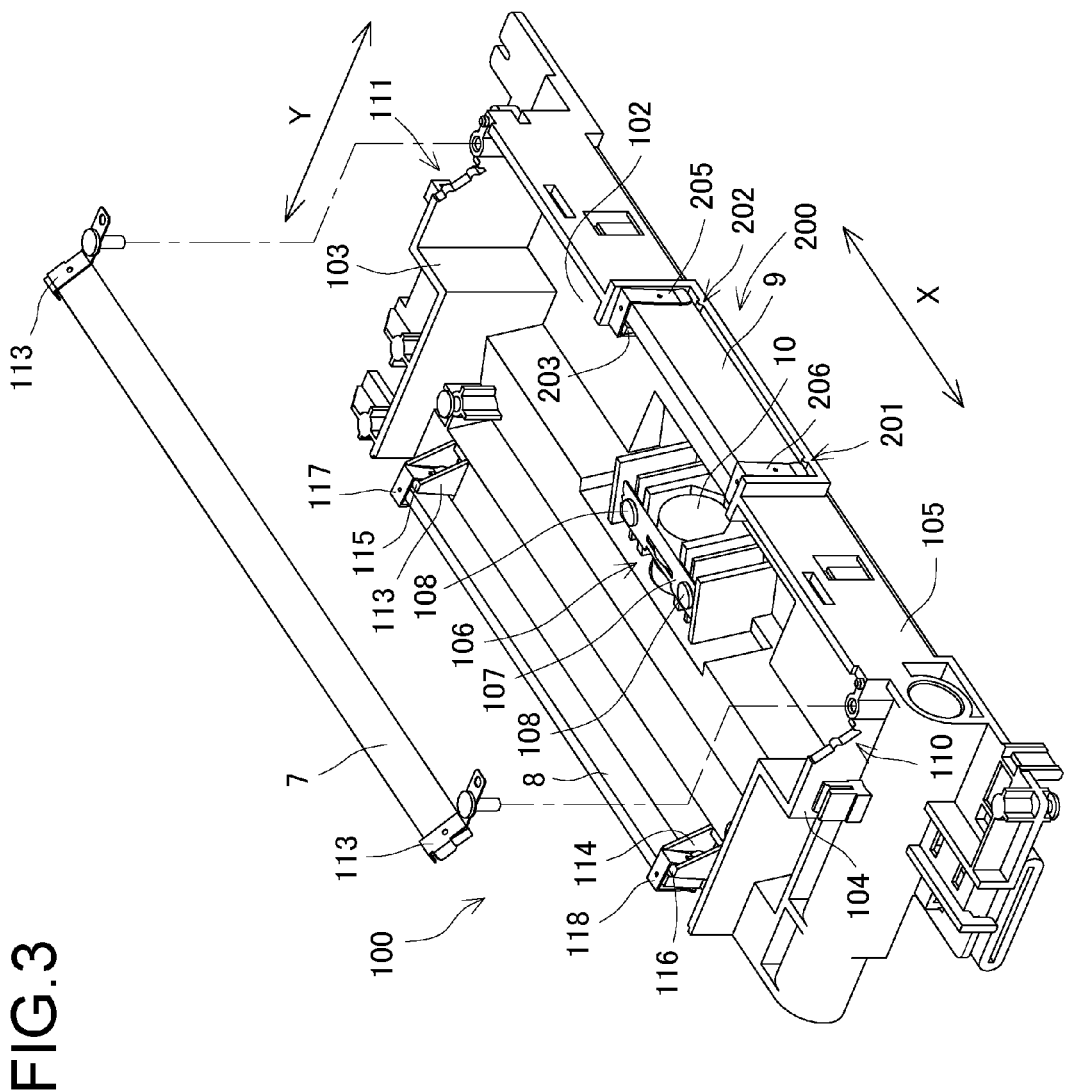
FIG. 3 is a perspective view showing an upper frame turned upside down.

FIG. 3 is a perspective view showing the upper frame 100 turned upside down (the upper frame 100 is viewed from below). As shown in the figure, the upper frame 100 comprises a top plate (a support plate supporting the lamp 6 and the lens 10) 102 located at the bottom of the figure, a first sidewall (side plate) 103 and a second sidewall (side plate) 104 formed at respective ends of the top plate 102 in the main scanning direction, shown by arrow X in the figure, and extending downward (in the figure, upward), and a third sidewall (side plate) 105 formed at an end of the top plate 102 in a sub-scanning direction shown by arrow Y in the figure and extending downward (in the figure, upward).

The upper frame 100 internally has a space S' with an open bottom which accommodates an optical system including the lens 10 and the mirrors 7, 8, and 9 so that the optical system is surround by the top plate 102 and the sidewalls 103, 104, and 105; the space S' also forms the optical path. That is, in the present embodiment, the sidewalls 103, 104, and 105 are installed upright on that surface of the top plate 102 with the lamp 6 mounted thereon which lies opposite a mounting surface 102a (see FIG. 5) of the top plate 102. The sidewalls 103, 104, and 105 further cooperates with the top plate 102 in forming the accommodation space S', in which the optical system is incorporated. An opening 300 is formed in the upper frame 100 opposite the top plate 102 to open the accommodation space S'.

A plurality of bent portions 194 are formed on the top plate 102 in order to increase the strength of the top plate 102. The top plate 102 has a pedestal (lens support portion) 106 formed of a synthetic resin integrally with the upper frame 100 and located in the accommodation space S'; the lens 10 is fixed to the pedestal 106. A leaf spring 107 is fixed to the pedestal 106, from above in the figure, with two screws 108 to fix the lens 10 to the pedestal 106.

Three projections 111 formed integrally with the sidewall 103 are arranged on a bottom surface (in the figure, a top surface) of the first sidewall 103. Two projections 110 are formed on a bottom surface (in the figure, a top surface) of the second sidewall 104. The projections 110 and 111 constitute a support section for the first mirror 7. The first mirror 7 is fixed to the upper frame 100 by placing ends of the first mirror 7 on the support section and then fixing leaf springs 113 to the respective sidewalls from above with screws.

Second mirror support sections 113 and 114 are formed on inner side surfaces of the top plate 102 integrally with the top plate 102 to support the second mirror 8. The second mirror support sections 113 and 114 comprise mirror support plates 115 and 116, respectively. As in the case of the first mirror 7, a projection is formed on that surface of each of the mirror support plates 115 and 116 on which the second mirror 8 is supported. The second mirror 8 is fixed by placing ends of the second mirror 8 on the projections and then sandwiching the ends of the second mirror 8 and the mirror support plates 115 and 116 between channel-shaped springs 117 and 118.

An opening 200 is formed in the third sidewall 105 at a position opposite to the lens 10. The top plate 102, forming the opening 200, has two projections 201 and 202. Final mirror support plates 203, 203 are formed at the opposite ends of the opening 200 (only one of the final mirror support plates is shown). The final mirror 9 is fixed to the upper frame 100 by placing the final mirror 9 on the projections 201 and 202 and the support plates 203, 203 and then sandwiching ends of the final mirror 9 and the support plates 203, 203 between channel-shaped leaf springs 205 and 206.

Furthermore, as seen in FIG. 2, the first mirror 7 and the second mirror 8 are fixed below the lens so as to form an optical path below the lens 10. However, the first mirror 7 and the second mirror 8 are fixed to the upper frame 100 from below as shown in FIG. 3, preventing the shape of the upper frame 100 from being complicated. This also prevents a mold for the upper frame 100 from being complicated, improving the accuracy of the upper frame 100 and the positional accuracy of the mirrors 7, 8, and 9. That is, the present embodiment adopts this configuration to solve a conventional problem. This will be described in detail. The housing 12, supporting the optical system including the optical elements, is molded of a synthetic resin in order to reduce the weight as described above. However, with the synthetic resin molding, the increased level of complicatedness of shape of the interior of the housing 12 reduces the accuracy of the mold and thus the positional accuracy of the optical elements. For example, when the mirrors and the optical paths are arranged below the lens as is the case with the unit disclosed in, for example, Japanese Patent Laid-Open No. 9-69915, it is necessary to form a fixing member for the lens in the unit and to further form, below the fixing member, a passage through which the optical paths pass and a mirror support section. However, if an opening is formed only in the upper part of the unit so that the mold can be removed only from the upper part of the unit, the direction in which the mold is removed and the like need to be taken into account, complicating the shape of the mold. In particular, the number of required molds increases with decreasing distance to the bottom of the unit, that is, the number increases consistently with the distance from the opening in the unit. Of course, to solve this problem, an adjustment mechanism for the mirrors may be provided. However, this disadvantageously increases the number of parts required and the number of assembly steps, sharply increasing costs.

Thus, in the present embodiment, as previously described, even though the mirror group (7, 8, and 9) is fixed to the upper frame 100 below the lens 10 and the optical path is formed below the lens 10, the bottom of the upper frame 100 is open (the opening 300). This prevents the shape of the mold from being complicated, increasing the accuracy of the frame (mirror support section), located at the bottom of the reading unit 3, and thus the positional accuracy of the mirror group. Furthermore, the mirror group can be easily mounted on the frame 100.

Figure 4:
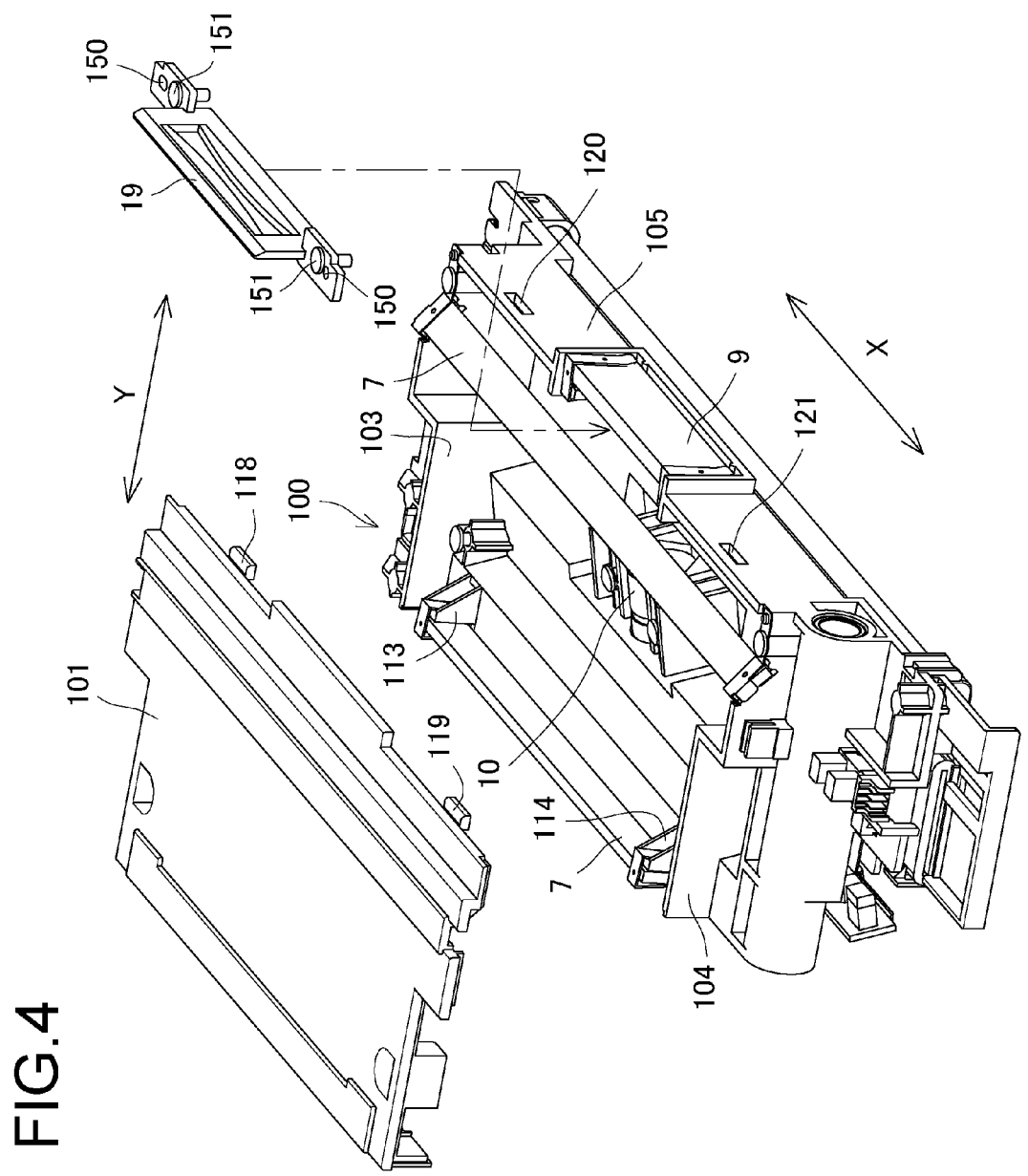
FIG. 4 is a perspective view of the upper frame and a lower frame.

FIG. 4 shows a perspective view of the upper frame 100 and the lower frame 101. Also in this figure, the upper frame 100 is turned upside down.

As shown in FIG. 4, two projections 118 and 119 are integrally formed at an end of the lower frame 101 which lies closer to the incidence surface of the lens 10 in the sub-scanning direction, shown by arrow Y. Holes 120 and 121 corresponding to the projections 118 and 119 are formed in the upper frame 100. Furthermore, two projections (not shown) are integrally formed at an end of the lower frame 101 which lies closer to an exit surface of the lens 10 in the sub-scanning direction, shown by arrow Y. Holes (not shown) corresponding to the projections are formed in the upper frame 100. The lower frame 101 is fixed to the upper frame 100 by inserting the projections into the holes.

Positioning holes 150 are formed in the shading correction plate 19 at the opposite ends thereof in the main scanning direction. The shading correction plate 19 is positioned by aligning the holes 150 with projections formed on the upper frame 100 and is fixed by tightening screws 151. Thus, the shading correction plate 19 is mounted on the upper frame 100 from below as is the case with the lens 10 and the mirrors 7 and 8.

Figure 5:
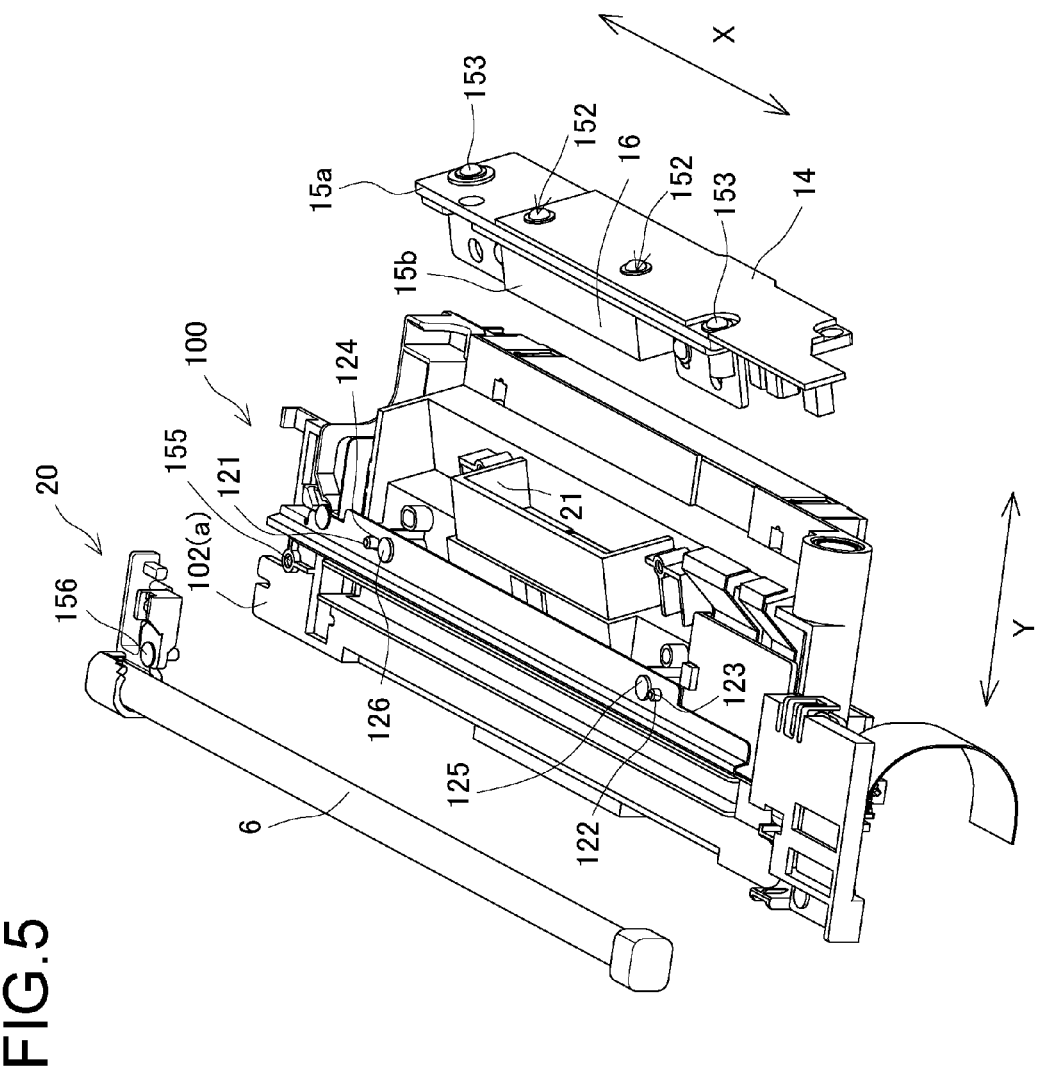
FIG. 5 is an exploded perspective view of the reading unit as viewed from a top plate.
Figure 6:
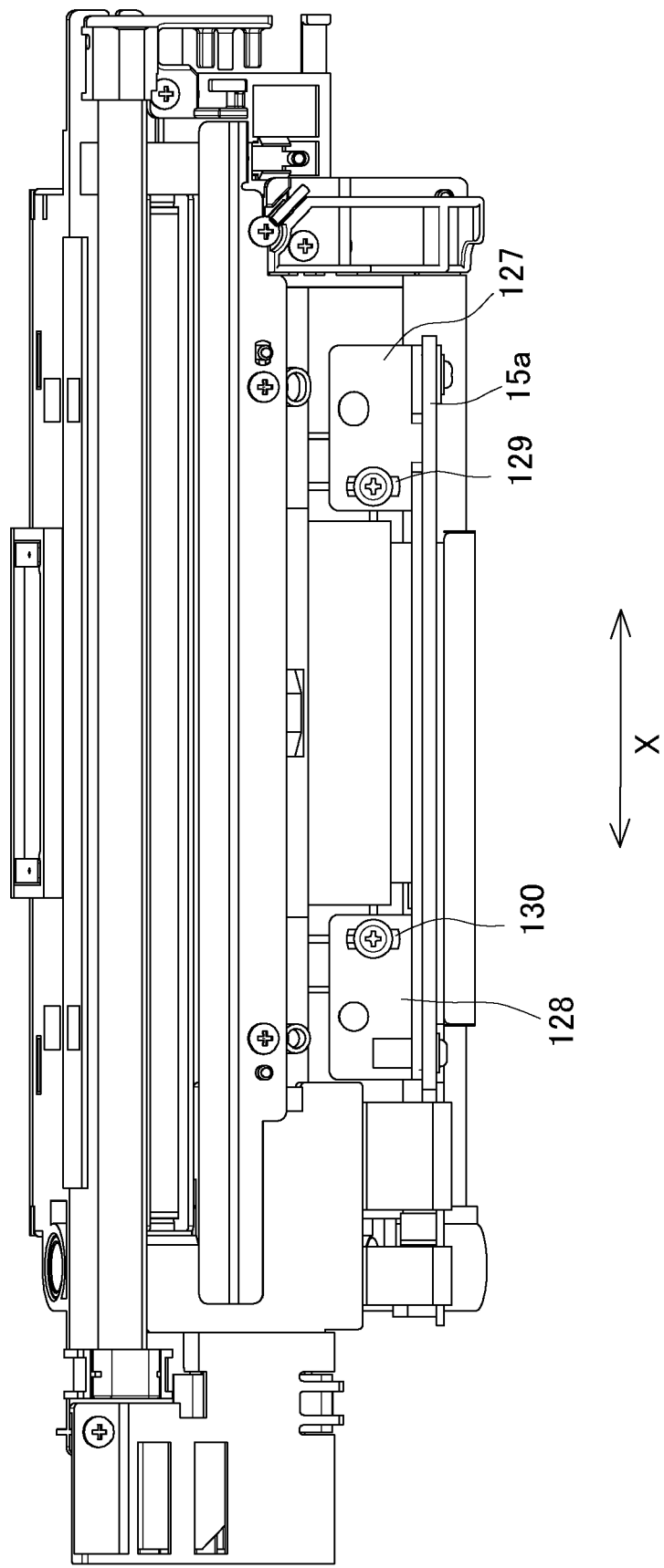
FIG. 6 is a plan view of the assembled reading unit.

FIG. 5 shows an exploded perspective view of the reading unit as viewed from the top plate 102. FIG. 6 shows a plan view of the assembled reading unit. As shown in these figures, the lamp 6, the reflector 18, and the sensor unit 11 are fixed to the top surface of the upper frame 100, that is, the top plate 102 of the upper frame 100. The lamp 6 is placed on the top surface (mounting surface 102a) of the top plate 102 of the upper frame 100. A lamp holding member 20 is provided at the end of the lamp 6 to hold the lamp 6. The lamp 6 is fixed to the mounting surface 102a of the top plate 102 via the lamp holding member 20 by tightening a screw 156 set in a hole formed in the lamp holding member 20, into a screw hole 155 formed in the top surface of the top plate 102. That is, in the present embodiment, the lamp 6 is located outside the housing 12.

Furthermore, holes 123 and 124 are formed in the reflector 18 at positions corresponding to positioning projections 121 and 122 formed on the top surface of the upper frame 100. The reflector 18 is positioned by inserting the projections 121 and 122 into the holes 123 and 124 and is fixed to a predetermined position on the upper frame 100 by tightening the screws 125 and 126.

In the present embodiment, the sensor unit 11 has the holding member 15 holding the image sensor 13. The holding member is composed of a first holding member 15a and a second holding member 15b. The sensor unit 11 in the present embodiment is adjusted as described below.

First, the sensor board 14 and the first holding member 15a are coupled together with two screws 152. Then, a jig is used to move the first holding member 15a to adjust the parallelism of the image sensor 13 to a reading line. Two screws 153 are then used to combine the first holding member 15a and the second holding member 15b together. As shown in FIG. 6, arms 127 and 128 are formed at an end of the second holding member 15b in the main scanning direction, shown by arrow X and extends to the inside of the image-capturing unit 3. Openings 129 and 130 that are elongate in the sub-scanning direction, shown by arrow Y, are formed in the arms 127 and 128, respectively. Thus, subsequently, these arrangements and a jig are used to adjust the distance (scaling) to the image sensor 13 in the sub-scanning direction and the parallelism of the image sensor 13 to a document reading surface. After the adjustment, the screws are tightened for fixation.

Furthermore, in the present embodiment, the second holding member 15b has a cylindrical light blocking member 16 formed so as to prevent external light from entering the image sensor 13. The light blocking member 16 is interposed in an optical path guide member 21 formed on the top surface of the upper frame 100 and having a function of guiding light having passed through the lens 10 and blocking light. Accordingly, in the present configuration, the sensor board 14 with the image sensor 13 mounted thereon is located outside the housing 12.

As described above, in the image-capturing apparatus (first reading unit 3) according to the present embodiment, the lamp (light source) 6 as a heating element is located outside the housing 12, whereas the optical system comprising the optical elements 7, 8, 9, . . . is located inside the housing 12. Consequently, radiation heat from the lamp 6 is blocked by the housing 12, minimizing the adverse effect of heat on the optical system. Furthermore, in the present embodiment, as in the case of the lamp 6, the sensor board 14 is located outside the housing 12. Thus, heat from the image sensor 13, acting as a heat source, is blocked by the housing 12, inhibiting the possible adverse effect of heat from the sensor on the optical system.

The present application claims priority rights from Japanese Pat. App. No. 2006-356458, which is herein incorporated by reference.

What is claimed is:

1. An image-capturing unit for capturing image information from documents on an image-capturing platen, the image-capturing unit comprising:
a light source for irradiating documents with light;
a mirror group composed of a plurality of mirrors, for reflecting light reflected from a document;
a final mirror for reflecting light reflected by said mirror group;
a lens for condensing light incident on said lens via the final mirror;
an image sensor for photoelectrically converting light condensed on said sensor by the lens;
a sensor board on which said image sensor is mounted; and
a synthetic-resin frame into which said light source, said mirror group, said lens, and said sensor board are mounted; wherein
said frame includes
an upper frame having a top plate and sidewalls extending downward from said top plate, said upper frame having a space inside surrounded by said top plate and sidewalls and whose bottom portion is open, and
a lower frame for covering the bottom portion of said upper frame;
a light-source anchoring portion is formed on an upper side of said top plate of said upper-frame, in order for said light source to be anchored thereto, and said light source is anchored along the upper side of said upper-frame top plate to said light-source anchoring portion;
a lens support member supporting said lens, said lens as supported by said lens support member, and said sensor board on which said image sensor is mounted are each mounted on a lower side of said top plate;
said light source is disposed along one edge of said upper frame with respect to said lens, and said sensor board is disposed on an opposite edge of said upper frame with respect to said lens; and
a mirror support member, formed either on the lower side of said top plate, or on one of said sidewalls of, said upper frame, for supporting said mirror group from below said lens.

2. The image-capturing unit according to claim 1, wherein said sensor board with the image sensor mounted thereon is adjustably mounted on the upper side of said top plate of said upper frame.

3. The image-capturing unit according to claim 1, wherein said mirror group comprises a first mirror for receiving light from a document, and a second mirror for reflecting light from said first mirror to said final mirror.

4. The image-capturing unit according to claim 3, wherein said lens is positioned between said first mirror and said second mirror.

5. The image-capturing unit according to claim 3, wherein:
said final mirror is positioned below said image sensor;
the optical path formed between said final mirror and said image sensor is inclined with respect to the image-capturing platen; and
said light source is positioned between said lens and said final mirror, and flanking the optical path between platen and said first mirror, on the side opposite said lens.

6. The image-capturing unit according to claim 3, further comprising a shading correction plate fixed to said upper frame between said first mirror and said final mirror, for adjusting quantity of light in the optical path between said second mirror and said final mirror, and in the optical path between said final mirror and said lens.

7. An image-capturing apparatus comprising a platen for carrying documents, and an image-capturing unit traveling along the platen to capture image information from documents, wherein the image-capturing unit is an image-capturing unit according to claim 1.

8. An image-capturing unit for capturing image information from documents on an image-capturing platen, the image-capturing unit comprising:
- a light source for irradiating documents with light;
- a mirror group composed of a plurality of mirrors, for reflecting light reflected from a document;
- a final mirror for reflecting light reflected by said mirror group;
- a lens for condensing light incident on said lens via the final mirror;
- an image sensor for photoelectrically converting light condensed on said sensor by said lens;
- a sensor board on which said image sensor is mounted; and
- a synthetic-resin frame into which said light source, said mirror group, said lens, and said sensor board are mounted; wherein said frame includes
- a first frame having a plate and sidewalls extending from said plate, said first frame having a space inside surrounded by said plate and sidewalls and whose side opposite said plate is open, and
- a second frame for covering the side of said first frame opposite said plate;
- a light-source anchoring portion is formed on a document side of said plate of said first frame, for anchoring said light source, and said light source is anchored along the document side of said first-frame plate to said light-source anchoring portion;
- a lens support member supporting said lens, said lens as supported by said lens support member, and said sensor board on which said image sensor is mounted are each mounted on the side of said first-frame plate reverse from the document side;
- said light source is disposed along one edge of said first frame with respect to said lens, and said sensor board is disposed on an opposite edge of said first frame with respect to said lens; and
- a mirror support member, formed either on the reverse side of said plate, or on one of said sidewalls, of said first frame, for supporting said mirror group from more toward said second frame than is said lens.

* * * * *